INVENTOR
R. G. Le Tourneau
BY
ATTORNEY

Patented June 6, 1933

1,912,645

UNITED STATES PATENT OFFICE

ROBERT G. LE TOURNEAU, OF STOCKTON, CALIFORNIA

POWER CONTROL UNIT

Application filed February 2, 1931. Serial No. 512,979.

This invention relates to power units adapted to be mounted on a tractor to be controlled by the operator of the same, and by means of which the operation of various features of an implement connected to and hauled by the tractor may be controlled.

The principal objects of my invention are to provide a mechanism for the purpose by means of which a pair of separate control or other mechanisms of an implement may be operated simultaneously or separately at the option of the operator; one by means of which such mechanisms may be manipulated easily and accurately with a minimum of effort on the part of the operator; and one with which the operations are effected regardless of whether the parts to which the unit is connected are directly aligned with the unit and tractor or not. Other features of novelty and merit will become apparent from a perusal of the following specification.

These objects I accomplish by means of such structure and relative arrangement of parts as will fully appear by a perusal of the following specification and claims.

In the drawings similar characters of reference indicate corresponding parts in the several views.

Figure 1:
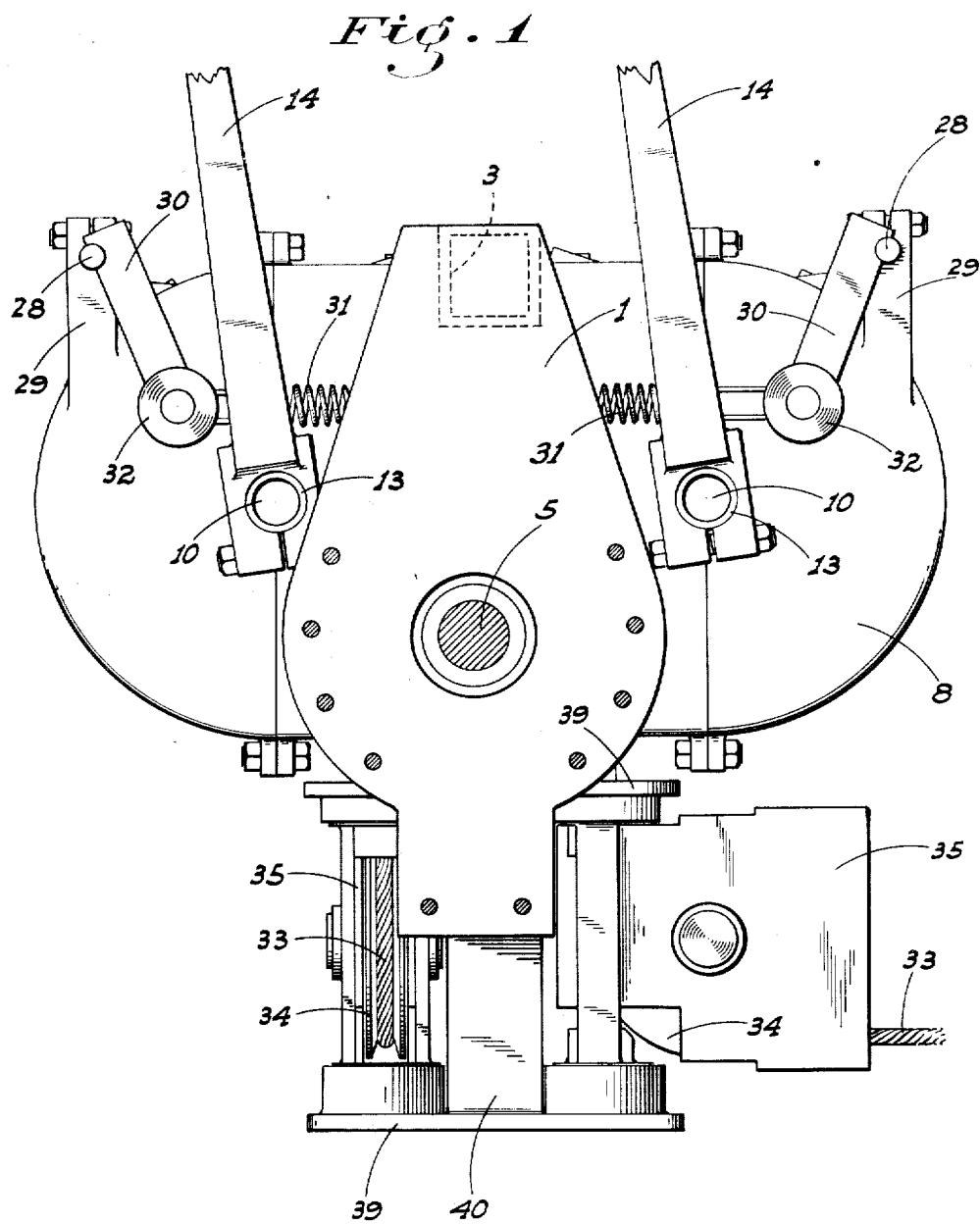
Fig. 1 is a front end view of my improved power unit.
Figure 2:
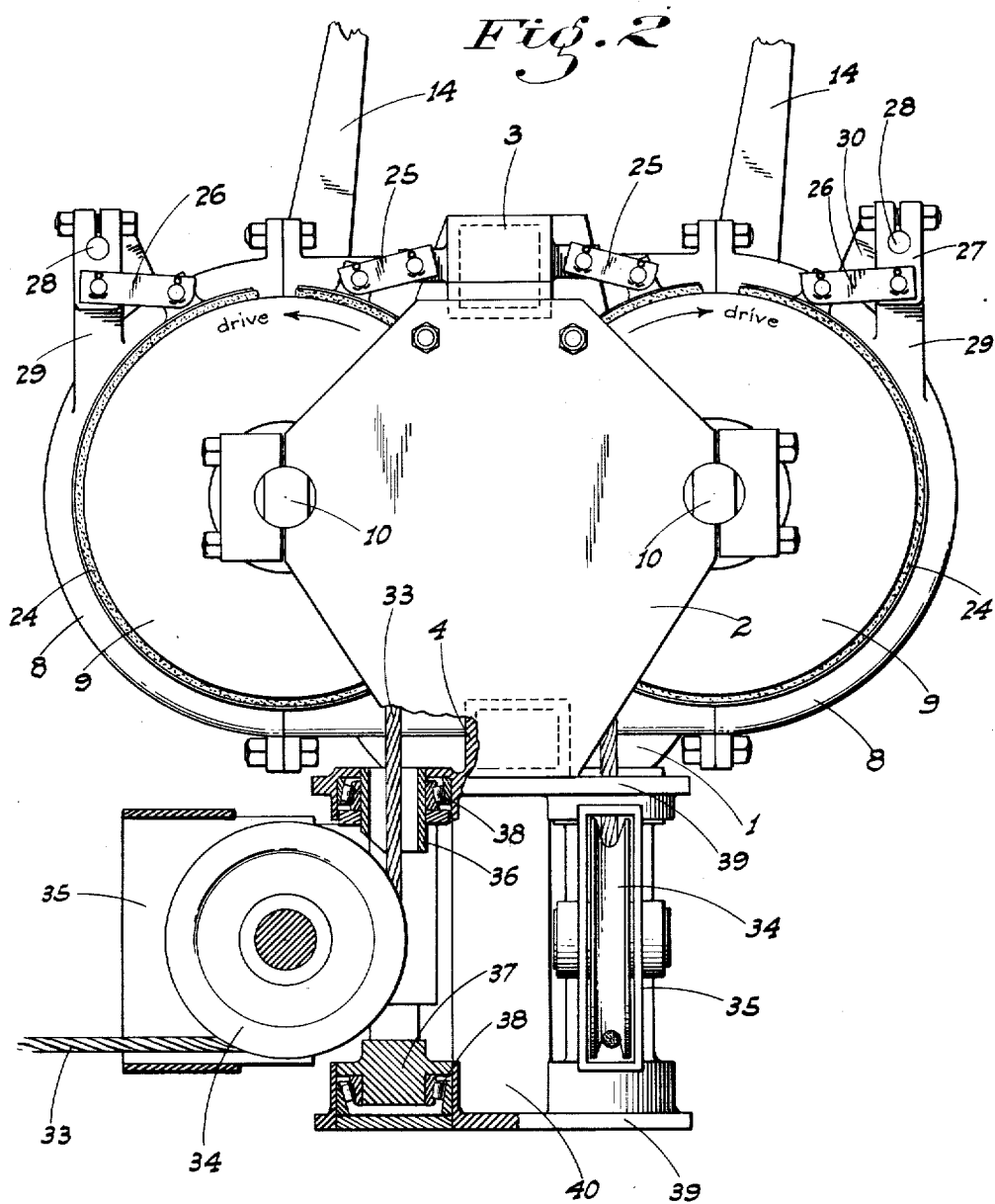
Fig. 2 is a rear end view of the same, partly in section.
Figure 3:
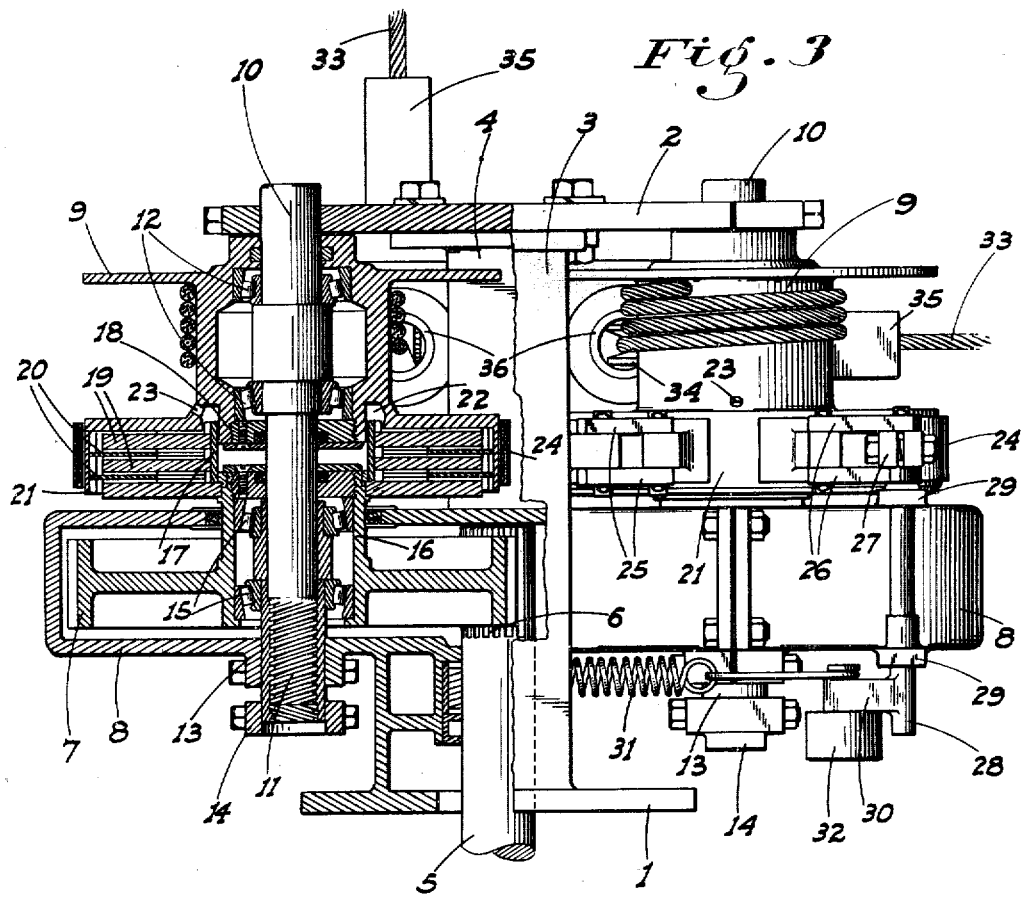
Fig. 3 is a top plan view of the unit, partly in section.
Figure 4:
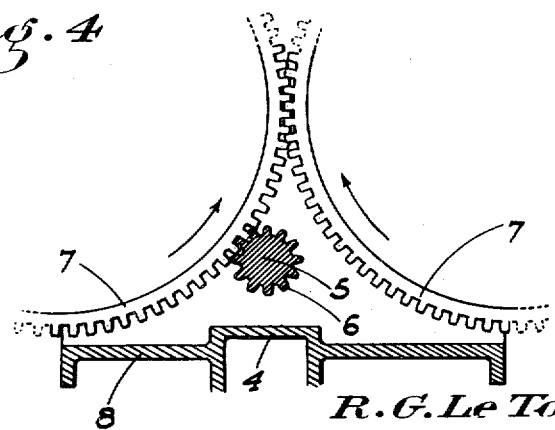
Fig. 4 is a fragmentary end view of the driving gear arrangement.

Referring now more particularly to the characters of reference on the drawings, the numerals 1 and 2 denote front and rear plates respectively, which are vertically disposed and are rigidly connected to and extend between the top and bottom beams 3 and 4 respectively, said parts constituting the frame structure of the unit.

The plate 1 is adapted to abut against and be rigidly secured to the rear end of the transmission housing of a tractor of a certain standard type, from which housing a longitudinally extending shaft 5, driven from the engine of the tractor, projects rearwardly. This shaft is disposed above the lower beam 4, and on its rear end is formed with a pinion 6. This pinion continually meshes with one only of a pair of spur gears 7, which mesh with each other. These gears of course rotate in opposite directions, and so that they turn away from each other at the top. The gears and pinion are enclosed in a housing unit 8 secured to the frame beams. Each gear is associated with a cable drum 9 disposed axially therewith but separate therefrom, there being a clutch and brake structure between the drum and gear.

Since the mechanism associated with one gear is a duplicate of that associated with the other, it will be sufficient to describe one such mechanism only. The axial shaft 10 of each gear, drum and clutch unit, and which is parallel to the shaft 5, is clamped at one end in connection with the plate 2, and at its other end projects beyond the front end of the housing 8 and is provided with a multiple-lead thread 11. The drum, which is just forwardly of the rear plate 2, turns on the shaft 10 with anti-friction bearings 12 disposed between the drum and shaft and arranged so that the drum can have no movement along the shaft.

A sleeve 13 is mounted on the shaft 10 ahead of the drum, which sleeve at its forward end has threaded engagement with the thread portion of the shaft. An upstanding lever 14 is clamped on the outer end of the sleeve so as to turn the same, which will cause a longitudinal movement in one direction or the other to be imparted to the sleeve on account of its threaded engagement with the stationary shaft.

The gear 7 is turnable on the sleeve, with anti-friction bearings 15 there between, arranged so that with the longitudinal movement of the sleeve, the gear will be correspondingly moved forward or back.

The hub 16 of the gear projects beyond the rear end of the housing 8 and is there provided with an extension 17 which overlaps the adjacent end of the hub 18 of the drum 9. Clutch plates 19 are splined on the extension 17, while similar co-operating plates 20 are slidably splined in the brake drum 21, which is mounted on the adjacent end of the drum 9 in overhanging relation to the extension 17.

With the movement of the gear 7 along the shaft therefor, the various clutch plates will be either engaged or disengaged, and the drum will be driven or will be freely turnable relative to the gear as the case may be.

The space between the shaft and the gear hub and its extension is adapted to be filled with a lubricant, so as to lubricate the various bearings; the overhanging relation of the extension 17 and the drum hub 18, preventing this lubricant from being thrown directly out and possibly finding its way between the clutch plates. Instead, if any lubricant does pass between the extension and the drum hub, it is caught in an annular pocket 23, formed with the drum rearwardly of the clutch plates. From this pocket any excess may escape by centrifugal action through a hole 23 communicating with the face of the drum. The lubricant on the drum will do more good than harm, since it will work into the cable wrapped about the drum and will help keep the same from rusting.

An automatic functioning brake structure is associated with the brake drum 21, which acts to release the brake drum when the latter is driven and to grab the same when the driving connection is discontinued. This brake structure is arranged as follows:

A brake band 24 is disposed about the brake drum, having its separated ends on the upper side of the drum. The band at its end nearest the beam 3 is connected thereto by substantially tangentially disposed upwardly sloping links 25.

Similar links 26 are connected at one end to the other end of the band, said links at their opposite end being connected to the lower end of an arm 27. The upper end of this arm is fixed on a shaft 28, which extends parallel to the axis of the drum, and is journalled in standards 29, fixed on the housing 8. Another arm 30 depends from this shaft ahead of the housing and is engaged by a tension spring 31. Though a separate spring may be used for the arm of each brake unit, I preferably employ a single spring extending between the two arms as shown. A roller 32 on the lower end of the arm 30 is positioned in the transverse plane of the adjacent lever 14 to be engaged thereby only after said lever has been turned to fully disengage the corresponding clutch. Since the periphery of the brake drum when driven turns outwardly relative to the central beam 3, it will be seen that such movement acting through the band tends to exert a pull on the links 25 to straighten the same out, and exerts a push on the links 26, tending to move them away from the brake drum. The band is thus held clear of the drum, or at least sufficiently so that it will not frictionally engage the drum with sufficient force to retard the driving of the same.

When the driving of the drum is discontinued and the drum tends to rotate in the opposite direction, the sleeve 31 acts to push on the links 26, causing the adjacent end of the band to grab the drum. The band tends to turn on the drum, thereby tending to deflect or cramp the links 25 toward the drum, and causing the adjacent end of the band to also grab the drum. The drum and its connected parts are thus locked against rotation. When it is desired to release the band without driving the drum, so as to allow the cable wound on the cable drum to be freely payed out, the corresponding lever 14 is shifted so that it will engage the roller 32 and push the arms 30 and 27 outwardly. This pulls the links 26 away from the drum, which will cause the brake band to be likewise moved clear of the drum.

From the above description of the parts it will be evident that the lever 14 must always occupy a definite position relative to the roller 32, especially when the clutch is initially thrown out. In other words, the lever must at no time engage said roller with the initial throwing out of the clutch, but only subsequent to such movement. This position can, of course, be insured by adjusting the lever relative to the sleeve on which it is mounted.

A cable 33 is wound on the drum 9, and is anchored on one end thereon so that its free end depends from the inside of the drum and will be wound thereon when the latter is driven. The cable then passes through a direction changing sheave 34, disposed on a horizontal axis a certain distance below the drum. This sheave is mounted on a housing 35 open on both ends; the sides of the housing being rigidly secured to upper and lower vertically aligned spindle elements 36 and 37 respectively. These elements are aligned with the inner face of the drum and sheave, and are disposed centrally of the length of the drum. The upper spindle element is hollow so that the cable is free to pass from the drum to the sheave without interference. The spindle elements are freely turnable on bearings 38 supported from horizontally and vertically spaced plates 39. The upper plate is fixed to and under the beam 4, while the lower plate is supported from the upper one by a post 40. This post 40 must of course be of a very substantial nature, since the entire pull on the cables is imparted to the sheave which must, of course, be mounted in a manner so as to withstand strain.

It is to be understood, of course, that there is a sheave for each cable and its drum, and both sheaves are free to swing independent of each other through an arc of 180 degrees or more. This permits the mechanism controlled from and connected to said cables to be at different positions relative to the tractor on which the power unit is mounted while maintaining a straight pull on the cables.

An instance of the use to which this power unit may be put is for separately controlling the raising and lowering of the bowl and moving the endgate of the scraper shown in my co-pending application for patent, Serial No. 506,521, filed January 5, 1931. In the evident that the implement attached to the tractor only requires the use of a single control cable, the other portion of the power unit merely remains idle without in any way interfering with the functioning of the portion being used.

From the foregoing description it will be readily seen that I have produced such a device as substantially fulfills the objects of the invention as set forth herein.

While this specification sets forth in detail the present and preferred construction of the device, still in practice deviations from such detail may be resorted to as do not form a departure from the spirit of the invention, as defined by the appended claims.

Having thus described my invention what I claim as new and useful and desire to secure by Letters Patent is:

1. A power unit including a frame, a shaft anchored on the frame, a driving gear turnable about and movable lengthwise of the shaft toward one end, a cable drum turnable about the shaft independent of the gear and disposed between the gear and the other end of the shaft, means mounting the drum against movement along the shaft, a clutch structure including an element connected to the gear and a co-operating element connected to the drum, a lever turnable axially of the shaft, and means between the lever and gear to move the latter lengthwise of the shaft with the turning of the lever.

2. A power unit including a frame, a shaft anchored on the frame, a driving gear turnable about and movable lengthwise of the shaft toward one end, a cable drum turnable about the shaft independent of the gear and disposed between the gear and the other end of the shaft, means mounting the drum against movement along the shaft, a clutch structure including an element connected to the gear and a co-operating element connected to the drum, a sleeve threaded on the shaft whereby when the sleeve is rotated it will move along the shaft, means for thus rotating the shaft, and connections between the sleeve and gear to cause the latter to be moved along the shaft with the sleeve but permitting independent rotative movement of the gear and sleeve.

3. A structure as in claim 1, with a brake structure associated with the drum adapted to automatically engage the same when the driving of the drum is discontinued, and means between the lever and brake structure for disengaging the brake with a movement of the lever in the same direction as but beyond the clutch disengaging movement of the lever.

4. A brake structure for a power unit including a brake drum adapted to be rotated in one direction, a band about the brake drum having its ends separated, links connected to one end of the band and extending thence substantially tangent to the drum in the direction of driven rotation of the latter, and spring means applied to the last named links to move them lengthwise toward the drum to cause the adjacent end of the band to grab the latter, and anchor links connected to the other end of the band and arranged to cause the adjacent end of the band to also grab the drum when the other end of the band frictionally engages the drum.

5. A brake structure for a power unit including a brake drum adapted to be rotated in one direction, a band about the brake drum having its ends separated, links connected to one end of the band and extending thence substantially tangent to the drum in the direction of driven rotation of the latter, and spring means applied to the last named links to move them lengthwise toward the drum to cause the adjacent end of the band to grab the latter, and anchor links connected to the other end of the band, and extending thence in a direction opposite to the direction of rotation of the drum when driven and disposed in acute angular relation to a line tangent to the drum.

6. A power unit including a cable drum, a driving gear mounted axially thereof, a brake associated with the drum, adapted to automatically engage the same when the driving of the drum is discontinued, a clutch structure between the gear and drum, means to operate the clutch including a lever mounted axially of the drum, means for disengaging the brake including an arm mounted for rotation about an axis parallel to the drum, and an element mounted on the outer end of the arm and disposed in the path of movement of the lever to be engaged thereby after the lever has been moved in a clutch throwout direction and to an extent greater than that necessary to throw out the clutch.

7. A power unit including a relatively fixed shaft, a driving gear turnably mounted on the shaft, a cable drum turnably mounted on the shaft separate from the gear, a releasable clutch between the gear and drum, a movable lever to operate the clutch, a brake associated with the drum and adapted to automatically engage the same when the driving of the drum is discontinued, and means between the lever and brake to disengage the latter from the drum with a movement of the lever in the same direction but beyond the clutch releasing movement of the lever.

In testimony whereof I affix my signature.

ROBERT G. LE TOURNEAU.

DISCLAIMER 1,912,645.—*Robert G. Le Tourneau*, Stockton, Calif. POWER CONTROL UNIT. Patent dated June 6, 1933. Disclaimer filed March 9, 1942, by the inventor and the assignee, *R. G. Le Tourneau, Inc.*

Hereby enter this disclaimer to claims 6 and 7 of the specification of said patent.

[*Official Gazette April 7, 1942.*]

leasable clutch between the gear and drum, a movable lever to operate the clutch, a brake associated with the drum and adapted to automatically engage the same when the driving of the drum is discontinued, and means between the lever and brake to disengage the latter from the drum with a movement of the lever in the same direction but beyond the clutch releasing movement of the lever.

In testimony whereof I affix my signature.

ROBERT G. LE TOURNEAU.

DISCLAIMER 1,912,645.—*Robert G. Le Tourneau*, Stockton, Calif. POWER CONTROL UNIT. Patent dated June 6, 1933. Disclaimer filed March 9, 1942, by the inventor and the assignee, *R. G. Le Tourneau, Inc.*

Hereby enter this disclaimer to claims 6 and 7 of the specification of said patent.

[*Official Gazette April 7, 1942.*]

DISCLAIMER 1,912,645.—*Robert G. Le Tourneau*, Stockton, Calif. POWER CONTROL UNIT. Patent dated June 6, 1933. Disclaimer filed March 9, 1942, by the inventor and the assignee, *R. G. Le Tourneau, Inc.*

Hereby enter this disclaimer to claims 6 and 7 of the specification of said patent.

[*Official Gazette April 7, 1942.*]